United States Patent [19]

Ito et al.

[11] 4,217,783
[45] Aug. 19, 1980

[54] MAGNETORESISTIVE PRESSURE-SENSING DEVICE FOR AUTOMOTIVE ELECTRONIC ENGINE CONTROL SYSTEMS

[75] Inventors: Susumu Ito; Morimasa Nagao; Toshio Yamagata; Nobuyuki Hayama, all of Tokyo, Japan

[73] Assignee: Nippon Electric Company, Ltd., Tokyo, Japan

[21] Appl. No.: 12,376

[22] Filed: Feb. 15, 1979

[51] Int. Cl.² ............................................. G01L 9/04
[52] U.S. Cl. ................................... 73/720; 73/726; 338/4; 338/32 R
[58] Field of Search ........... 73/720, 726, 728, DIG. 2; 338/32 R, 4; 324/209

[56] References Cited

U.S. PATENT DOCUMENTS

| | | | |
|---|---|---|---|
| 3,418,163 | 12/1968 | Oberg et al. | 324/209 |
| 3,807,223 | 4/1974 | Juillerat et al. | 73/DIG. 2 |
| 3,838,595 | 10/1974 | Godefroy | 73/DIG. 2 |

Primary Examiner—Donald O. Woodiel
Attorney, Agent, or Firm—Laff, Whitesel & Rockman

[57] ABSTRACT

A pressure sensor comprises essentially magnetoresistive elements formed on a diaphragm serving as a stress magnifier. The diaphragm may be made, for example, of glass in a thickness of 0.5 millimeter, and the magnetoresistive elements can be formed thereon in any desired pattern of thin stripes by ordinary thin-film techniques. Such sensor elements can be mass produced, e.g., by vapor deposition and etching on a large sheet of diaphragm material and cutting into chips of desired shape and size.

17 Claims, 31 Drawing Figures ($\lambda < 0$)        ($\lambda > 0$)

MAGNETORESISTIVE PRESSURE-SENSING DEVICE FOR AUTOMOTIVE ELECTRONIC ENGINE CONTROL SYSTEMS

This invention relates to a magnetoresistive pressure-sensing device for use in automotive, electronic engine control systems.

Recently, a wider application of electronics to automobiles has been promoted from the viewpoints of driving safty, fuel economy, easy handling, prevention of pollution, etc. so as to cover the whole range of them, including the engine control system. Particularly, a microprocessor-based electronic engine control system designed to improve the fuel economy and prevent air pollution is reported in an article entitled, "Special Report: Automotive Electronics gets the Green Light", by Gerald M. Walker, "Electronics", Sept. 29, 1977, pp. 83–88 (Reference 1). The electronic engine control system in FIG. 3 on page 86 of Reference 1, employs a 12-bit microprocessor and seven engine-condition sensors. The microprocessor controls two actuators thereby to control ignition timing and exhaust-gas recirculation, respectively. In this control system, one of the seven sensors is used for measuring the barometric pressure and another is used as a manifold pressure sensor for measuring the vacuum pressure in the engine manifold. The pressure information or the output of the two pressure sensors is fed to the microprocessor for ignition timing and recirculation control.

Figure 1:
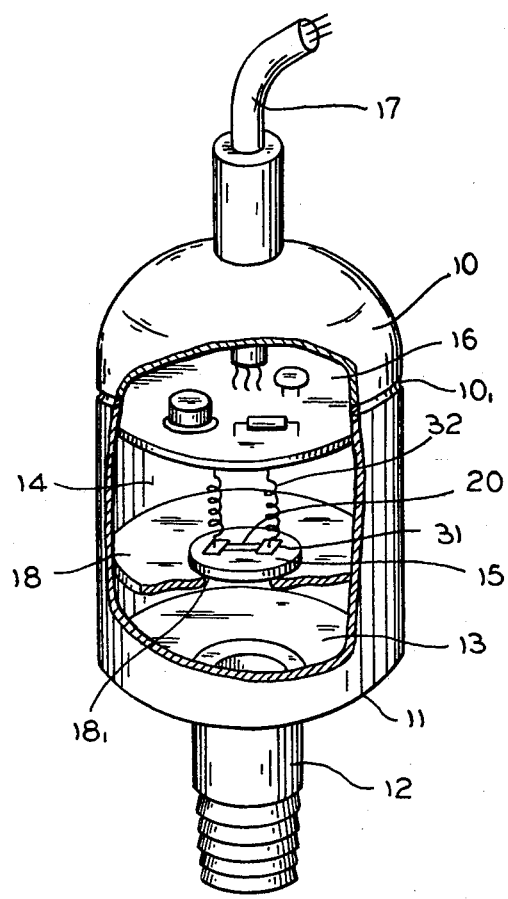

One known structure of such a pressure sensor is disclosed in an article entitled, "An IC Piezoresistive Pressure Sensor for Biomedical Instrumentation", by Samuel, Kensall D. Wise et al., "IEEE Transactions of Biomedical Engineering", Vol. BME-20, No. 2, March 1973, pp. 101–109 (Reference 2). As illustrated in FIG. 1 of Reference 2, the disclosed pressure sensor includes, as an essential means for stress magnification, an extremely thin silicon diaphragm of five-micron thickness combined with p-diffused piezoresistors, having piezoresistances which vary depending on the pressure being measured. For this reason, a highly advanced etching technique is required for the formation of such a thin diaphragm resulting in a costly device.

An object of the present invention is, therefore, to provide a magnetoresistive pressure-sensing device for use in an electronic engine control system for automotive vehicles, the device being free from the above-mentioned disadvantages.

The present invention comprises a casing having an interior space divided into two chambers by a perforated partition plate. One chamber receives a fluid which is introduced for pressure measurement, and the other receives a reference pressure for comparison with the pressure measurement of the fluid. A diaphragm is held fixed on the partition plate and deflected under the pressure of the fluid introduced into the one casing chamber. At least one magnetoresistive element is mounted on the diaphragm to produce an electrical resistance change depending on the deflection of the diaphragm. A detector is arranged to detect the variation in the electrical resistance of the magnetoresistive element.

Figure 2A:
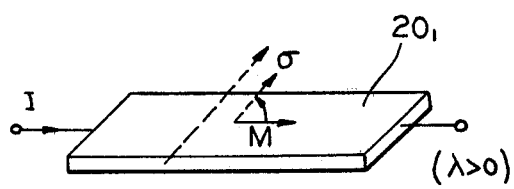
Figure 3A:
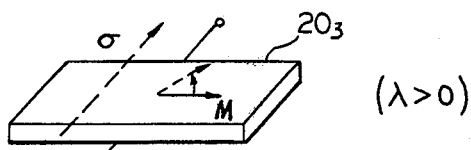
Figure 4A:
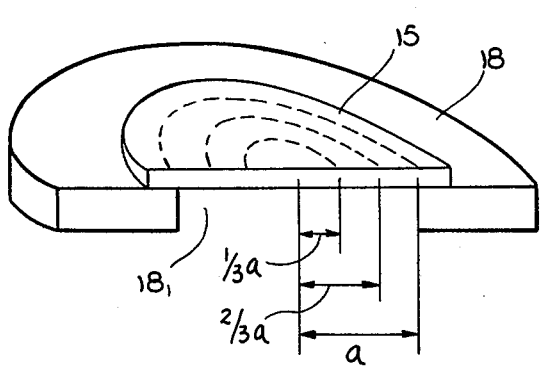
Figure 4B:
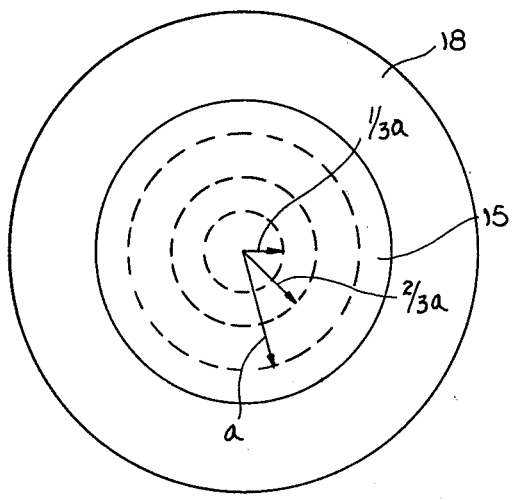

The above and other objects, features and advantages of the present invention will become apparent from the following description when taken in conjunction with the accompanying drawings in which:

FIG. 1 is a partly-cutaway perspective view of a preferred embodiment of the present invention;

FIGS. 2(a), (b) and (c) and FIGS. 3(a), (b) and (c) are diagrams which help explain the principle of the operation of the magnetoresistive element used in the present invention;

FIGS. 4(a) and (b) illustrate the diaphragm regions in which at least one magnetoresistive element is mounted;

FIGS. 5 (A) to (G), (a) to (g) and (u) to (x) are plan views showing different arrangements of the magnetoresistive elements; and FIGS. 6 (a) to (d) are circuit diagrams illustrating a part of one embodiment of the present invention.

FIG. 1 shows the pressure sensor of the present invention including a casing 11 having an inlet pipe 12 connected to one end thereof. Fluid to be measured such as atmospheric air or a mixture of fuel-air gases is introduced into the casing 11 through the pipe 12. In the casing 11, a partition plate 18 having an aperture $18_1$, formed centrally therein divides the casing interior space into two chambers including a reference pressure chamber 14 held at the atmospheric pressure and another chamber 13 which is pressurized by the fluid pressure to be measured. Fixed on the partition plate 18 over the central aperture $18_1$, is a diaphragm 15 which is made of glass and is deflectible under the fluid pressure introduced in the chamber 13 through the inlet pipe 12. Fixed on the glass diaphragm 15 is a magnetoresistive (referred to as MR hereinafter) element 20, which produces an electrical resistance change depending on the deflection of the diaphragm 15. Reference numeral 16 designates a detector arranged to detect the resistance change of the element 20 and to produce an electrical signal corresponding to the resistance change. Reference numeral 10 designates a cap on the top of the casing body 11 and over the detector 16. A cable 17 is connected to the detector 16 for providing an electrical output signal.

With this sensor structure, as the pressure to be measured in the chamber 13 of the casing 11 rises, the diaphragm 15 is deflected upwardly into a somewhat convex shape and a stress is induced therein to act upon the MR element 20, which is held on the reference pressure side or the top side of the diaphragm 15. Consequently, the magnetization of the element 20 is rotated with respect to the easy axis thereof by a definite angle so that the electrical resistance of the element 20 is changed by an amount depending on the pressure introduced in the casing chamber 13. It is to be noted that the rotated easy axis is restored to the initial state when the pressure equalizes with to the reference pressure.

Such a resistance change is detected and amplified by the detector 16 and an electrical signal corresponding to the pressure introduced is output therefrom through the cable 17 fixed to the casing cap 10.

A description will next be made of the relationship between the stress induced in the element 20 by way of the diaphragm 15 and the resistance change of the element 20 with reference to FIGS. 2 (a), (b) and (c) and FIGS. 3 (a), (b) and (c). In these figures, notation λ represents the magnetostriction constant of the element 20.

Figure 2B:
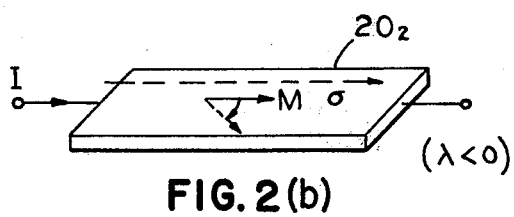

In FIGS. 2(a) and 2(b), reference character I designates a sensing current directed to flow through each of the elements $20_1$ and $20_2$ in parallel with or at right angles to the easy axis M (of magnetization), respectively. Each of the elements $20_1$ and $20_2$ is subjected to a stress α acting perpendicular to the direction of the current I.

Figure 2C:
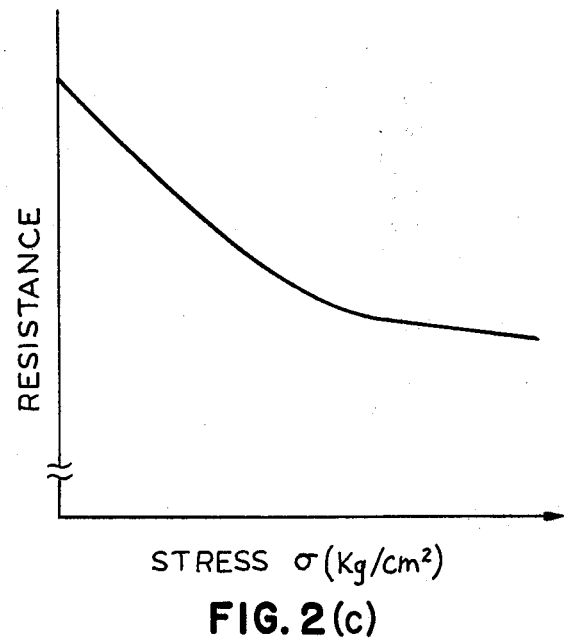

The relationship between the stress α and the resistance in the conditions of FIGS. 2(a) and 2(b) is illustrated in FIG. 2(c).

Figure 3B:
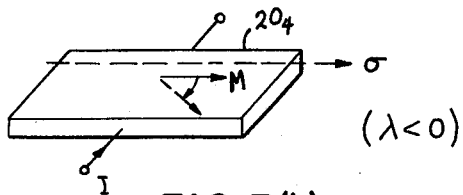

On the other hand, FIGS. 3(a) and 3(b) illustrate the respective states of MR elements 20₃ and 20₄ when subjected to the stress α acting in parallel to the sensing current I, which is directed through the elements 20₃ and 20₄ at right angles and in parallel to the easy axis M, respectively.

Figure 3C:
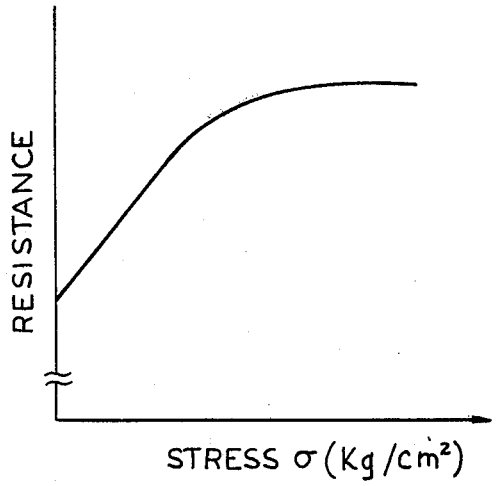

FIG. 3(c) shows the relationship between the stress α and the resistance under the conditions of FIGS. 3(a) and 3(b).

More specifically, when in FIGS. 2(a) and 2(b), the stress α is applied to the MR element 20₁ and 20₂ by way of the diaphragm 15, in the direction indicated by the dashed line with an arrowhead, the easy axis M of the element rotates under the stress into the direction perpendicular to that of current application. On the other hand, in the instances of FIGS. 3(a) and 3(b), the easy axis M rotates into the direction parallel with the direction of current application. Thus, in the instances of FIGS. 2(a) and 2(b), the rotated easy axis M and the current I are placed perpendicular to each other so that the resistance of the MR element is reduced as observed in FIG. 2(c). In the instances of FIGS. 3(a) and 3(b), the direction of the rotated easy axis M and that of the current application become parallel to each other so that the resistance of the element increases as observed in FIG. 3(c).

A description will next be given of the arrangement of the MR elements 20 on the diaphragm 15, referring to FIGS. 4(a) to (b) and FIGS. 5(A) to (G), (a) to (g) and (u) to (x).

The location of the MR elements on the diaphragm 15 is determined by radius a of the aperture 18₁, in the partition plate 18 on which the diaphragm 15 is held fixed, and the thickness, Young's modulus η and Poisson's ratio ν of the diaphragm. In the case of the circular shaped diaphragm 15 as illustrated, the most desirable regions for the mounting of the MR elements are the central region of radius ⅓a and the peripheral region ranging from radius ⅔a to radius a of the aperture 18₁, both indicated by broken lines. The desirability of selecting these diaphragm regions is disclosed on page 103 of Reference 2 showing the relationship between the stress and the radial distance from the diaphragm center. More in detail, as is evident from equation (1) and FIG. 2 of Reference 2, when a pressure is applied to a circular diaphragm of radius a, a stress induced in the diaphragm is positive within a radial distance of approximately ⅔a and negative outside thereof. Particularly, in the central region of radius of ⅓a and the peripheral region of a radial width of ⅓a, a large stress is induced to cause a substantial resistance change of an MR element mounted on the diaphragm.

Various examples of the shape and the arrangement of the MR elements having a magnetostriction constant λ which is negative, are illustrated in FIGS. 5(A) to (G). In FIGS. 5(A) to 5(G), each of the MR elements 21–26 is disposed in the same state as that shown in FIG. 2(b) so that the current I is directed in parallel to the easy axis M. In the elements 21–26, therefore, a stress is induced therein upon deflection of the diaphragm 15 which causes a rotation of the axis M from its normal direction parallel to the direction of the current I to the direction perpendicular thereto and hence causes a reduction in the resistance of the element.

Moreover, in FIGS. 5(a) to (g), each of the MR elements 27–29 and 40 corresponds to that shown in FIG. 3(a). When stressed, the resistance of each of the elements is increased as the easy axis M is rotated from its normal direction perpendicular to the direction of the current I to the direction parallel thereto. The MR elements 41 and 42 are disposed in the state corresponding to that shown in FIG. 2(a) and, when stressed, each easy axis M of the MR elements is turned from its normal direction parallel to the direction of the current I to the direction perpendicular therto, thus causing a reduction in the resistance of the element.

The arrangement on the diaphragm of a plurality of MR elements, for example, shown in FIGS. 5(A) to (G) and 5(a) to (g), is advantageous in that its sensor output can be increased. Further, the elements can not only be made in a stripe- or bar-like shape, but also can be made U-shaped (as at 23, FIG. 5D), radial (as at 25, FIG. 5F; 26, FIG. 5G) spiral (41, FIG. 5f), arcuate (42, FIG. 5g and FIG. 5X) or otherwise to increase their length with the result that a stress is effectively induced, thereby to attain a further increase in sensor output.

Figure 5A:
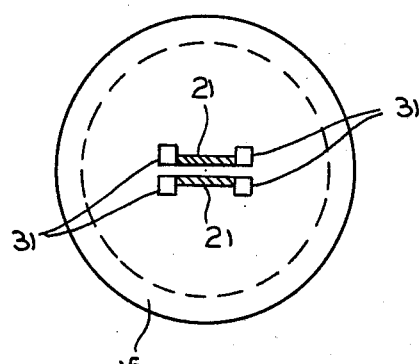
Figure 5A:
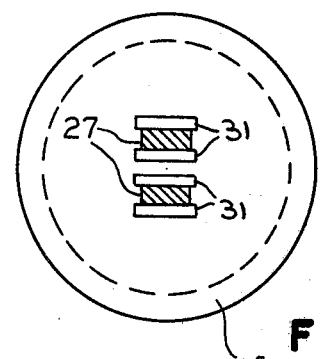
Figure 5B:
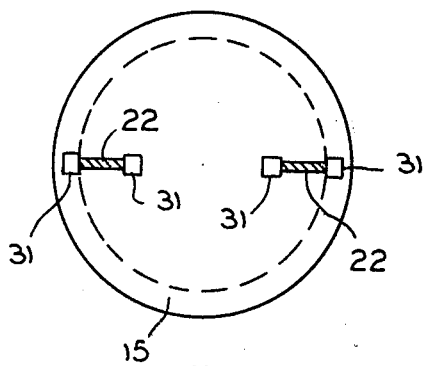
Figure 5B:
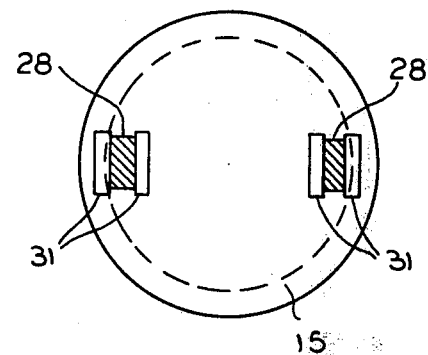
Figure 5C:
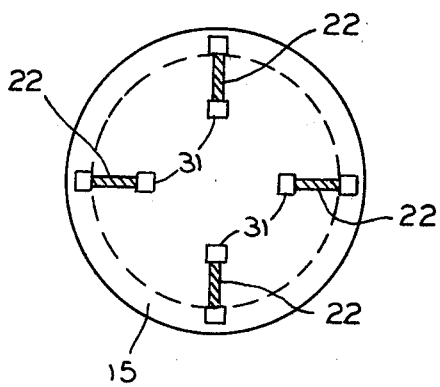
Figure 5C:
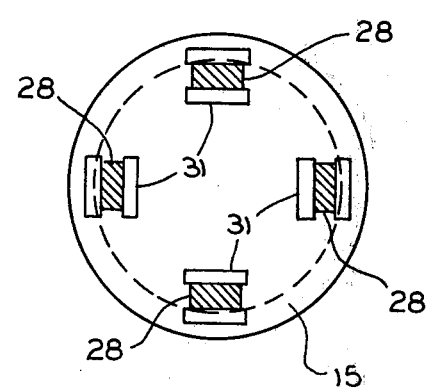
Figure 5D:
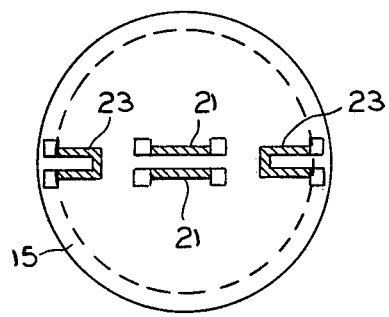
Figure 5D:
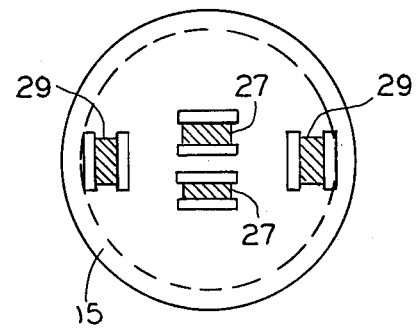
Figure 5E:
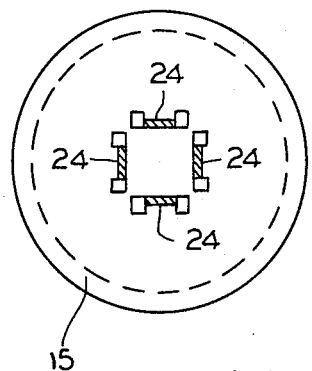
Figure 5E:
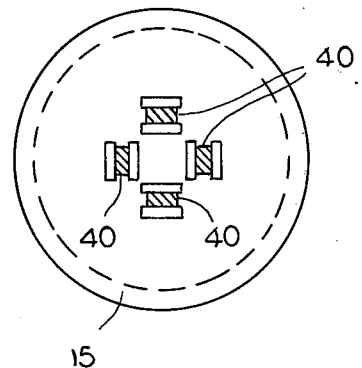
Figure 5F:
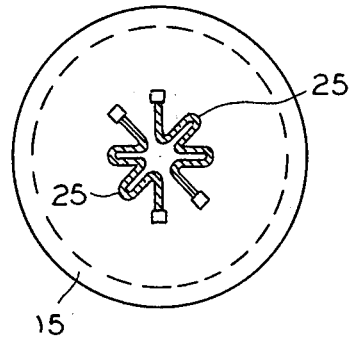
Figure 5F:
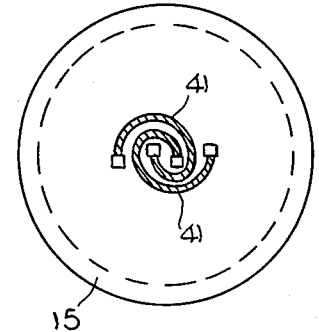
Figure 5G:
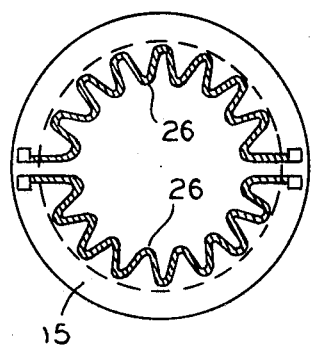
Figure 5G:
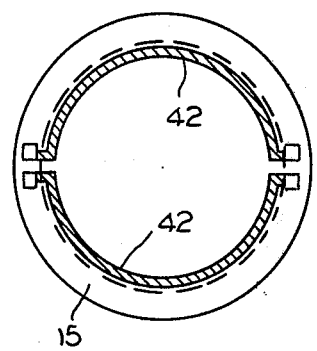
Figure 5U:
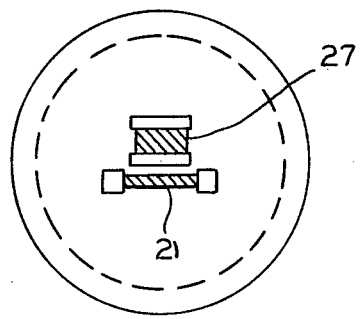
Figure 5V:
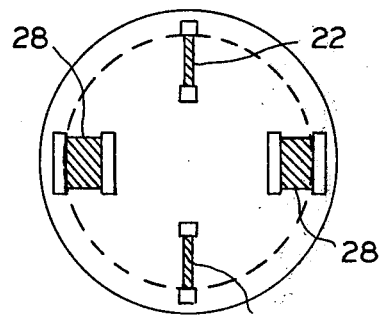
Figure 5W:
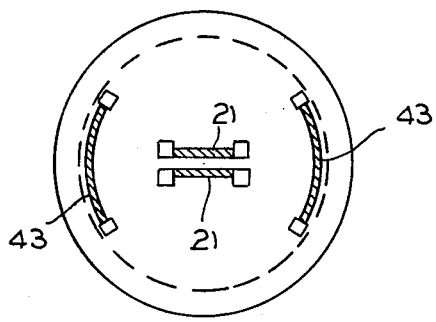
Figure 5X:
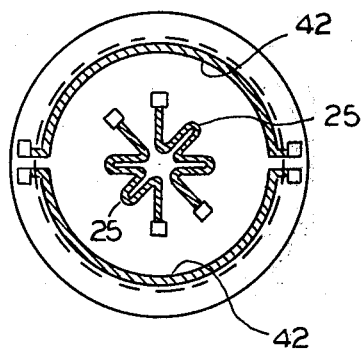

In FIGS. 5(u), (v), (w) and (x), MR elements of different forms shown in FIGS. 5(A) to (G) and 5(a) to (g) are mounted in different combinations on the same diaphragm 15. Specifically, each of the MR elements 27 and 28 is an element having a positive magnetostriction constant λ, and is resistance increases depending on the stress σ induced. Also, each of the MR elements 22 and 25 has a negative magnetostriction constant, so that its resistance decreases depending on the stress. The MR elements 42 and 43 are both elements which have a positive magnetostriction constant, resulting in a decrease of its resistance depending on the stress σ.

As will be readily understood, the shape and the arrangement of the MR elements for use in the present invention is not limited to those shown in FIGS. 5(A) to (G), (a) to (g) and (u) to (x) but may be modified many ways as long as it is ensured that the resistance of the MR elements changes depending upon deformation of the diaphragm 15. Incidentally, in each of the FIGS. 5(A) to (G), (a) to (g) and (u) to (x), the broken-line circle of radius a indicates the fixed edge of the diaphragm 15.

Figure 6A:
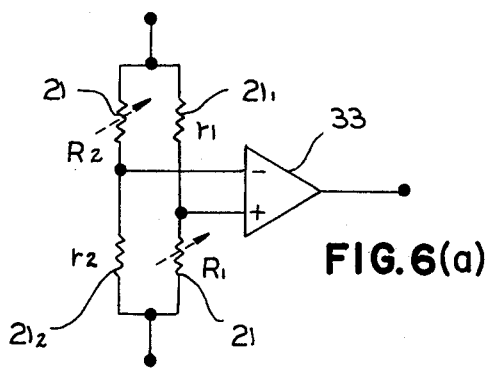

FIGS. 6(a) and (b) show detectors for detecting the resistance changes of a plurality of MR elements, the amplifiers are of the differential type. Also, variable resistances are indicated by the same reference numerals as the MR elements used in FIGS. (A) to (G), (a) to (g) and (u) to (x).

A description will first be made of the arrangement and the operation of the circuit shown in FIG. 6(a) as applied to the arrangement of FIG. 5(A). In FIG. 6(a), two MR elements 21 and two fixed resistances 21₁ and 21₂ are arranged to form a bridge circuit such that the resistance changes of the respective elements 21 are converted into opposite voltage changes. In this structure, the output level of the elements 21 is adjustable in the bridge circuit. Let $R_1$ and $R_2$ represent the resistance values of the respective elements 21 and $r_1$ and $r_2$, those of respective fixed resistances 21₁ and 21₂. Then, if the condition $R_1 \cdot R_2 = r_1 \cdot r_2$ is satisfied, no stress effect is caused, and the two elements 21 have the same output level.

It will be readily understood that the pressure detector output can be doubled by inputing the outputs of two MR elements simultaneously to a differential amplifier 33, as shown in FIG. 6(a). The circuit arrangement of FIG. 6(a) is applicable as well to the other MR arrangement shown in FIGS. 5(B), (F), (G), (a), (b), (f) and (g) with the same results.

Figure 6C:
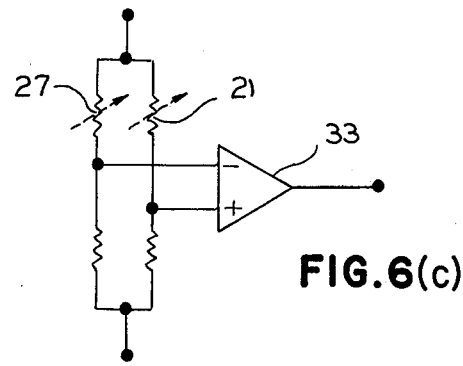
Figure 6B:
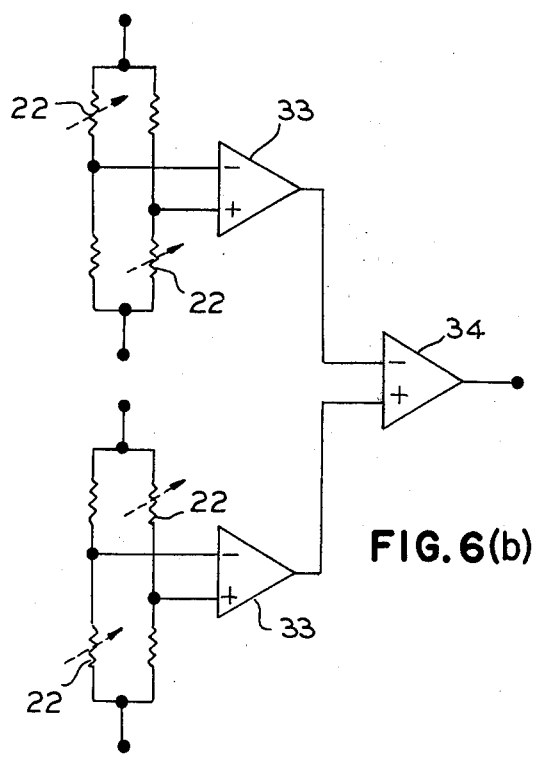

The circuit of FIG. 6(b) is an example of detector for use in the arrangement of FIG. 5(C). The detector of FIG. 6(b) includes two unit circuits each the same as the circuit shown in FIG. 6(a) and a differential amplifier 34. The two unit circuits are connected respectively to the positive and negative input terminals of the differential amplifier 34 in a manner such that the outputs of differential amplifiers 33 of the two unit circuits are opposite to each other in polarity. As will be apparent from the foregoing, this detector can provide an output which is four times that obtainable with a single MR element of the same type. Such a circuit arrangmenet is also applicable to the arrangements of FIGS. 5(D), (E), (c), (d), (e) (w) and (x).

Figure 6D:
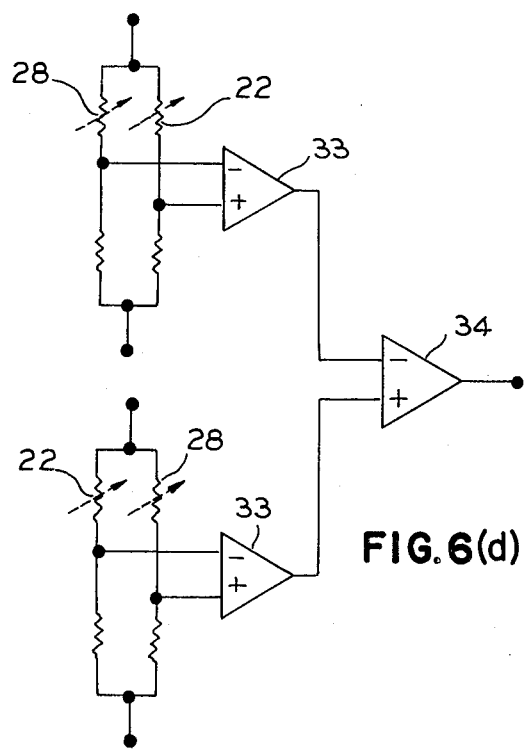

FIG. 6(c) is another form of a detector adaptable to the arrangement of FIG. 5(u). In this detector, the resistance of one MR elements 21 is reduced under an induced stress while that of the other MR element 27 is increased so that a detector output may be obtained which is twice that obtainable with a single MR element. FIG. 6(d) illustrates a further form of detector for use in the formation of FIG. 5(v). The detector of FIG. 6(d) includes two unit circuits each corresponding to the circuit of FIG. 6(c). The outputs of the respective unit circuits are connected respectively to the positive and negative input terminals of the second-stage differential amplifier 34, thus acting as signals of opposite polarity. The output level of this detector is four times that obtainable with a single MR element.

Incidentally, in the present device, the reference pressure chamber 14 may be evacuated instead of being fed with atmospheric air, if desired, to take the absolute value of the pressure to be measured. Any possible deterioration of the component elements of the reference pressure chamber 14 can be effectively prevented by feeding inert gas into it.

A description will next be made of the specific materials, shapes and sizes of the components of the present device as illustrated in FIGS. 1 to 6(a), in connection with the fabricating procedure of the device, merely by way of example.

The casing 11 is made of stainless steel with an outside diameter of 30 millimeters and a wall thickness of 3 millimeters (mm). The inlet pipe 12 and the partition plate 18, both made of stainless steel, are secured to the casing 11 by welding. The partition plate 18 has a thickness of 3 mm and is formed with a central aperture which is 10 mm in diameter. The diaphragm 15 on which the MR elements 20 and the terminals 31 are arranged, is made of glass, has a thickness of 0.5 mm., a diameter of 20 mm., a Young's modulus of 7,600 Kg (kilograms)/mm and a Poisson's ratio of 0.22, and is secured to the diaphragm 15 by an adhesive. The leads 32 extending from the respective terminals 31 are connected to the detector 16 formed on a ceramic base plate, which in turn is adhesively secured to the casing 11.

The casing cap 10 has a terminal means (of the glass hermetic seal type) connected with the detector 16, and sealed airtight to the casing body 11 by placing it in a vacuum furnace. The cap 10 per se is held lightly attached to the casing body 11 with a thermosetting adhesive applied to the cap bottom edge $10_1$, evacuating the furnace to 1 mmHg or less and then heating it to a temperature of 100° C. (degrees centigrade) to 150° C. for one to ten hours. In the casing sealed in this manner, the reference pressure chamber 14 is obviously held under vacuum of 1 mmHg or less. Subsequently, the casing is taken out of the furnace and then the cable 17 is connected thereto. The MR elements 20 are formed, for example, of a 90% Ni–10% Fe alloy (of magnetostriction constant $\lambda < 0$) on a diaphragm sheet by vacuum deposition and etching in thin stripes. In the case of FIG. 5(A), two of such stripes of 500 Å (angstrom) thickness, 1 mm. length and twenty-micron width are formed in parallel with each other, at a spacing of two microns. The diaphragm 15 carrying these MR elements 21 is arranged on the partition plate 18 concentrically on the central aperture of 10 mm in diameter. Each of the MR elements thus formed gave an electrical resistance of 200Ω(ohms) normally. When subjected to the pressure of 1 Kg/cm$^2$, it gave the resistance of 198.69Ω. The terminals 31 at the opposite ends of the MR elements are formed by Au vapor deposition (in thickness of 1 micron) and connected with the respective leads 32 by soldering.

The detector 16 used in this embodiment is of the type shown in FIG. 6(a). A current of 5 mA (milliamperes) is applied through each of the two MR elements 21. In the detector 16, voltages of 3.29 mV (millivolts) under the absolute pressure of 0.5 Kg/cm$^2$; of 6.58 mV, under 1.0 Kg/cm$^2$; of 9.87 mV, under 1.5 Kg/cm$^2$; and of 13.1 mV under 2.0 Kg/cm$^2$ were obtained at each of the input voltage terminals of the differential amplifier 33. The voltage input to the differential amplifier 33 was amplified approximately 152 times therein. The amplifier output was produced through the cable 17 with a sensitivity of approximately 1 V/(kg/cm$^2$). The minimum detectable pressure was 0.05 Kg/cm$^2$ or less. The device responded to pressures up to the maximum of 2 Kg/cm$^2$ with an error within ±5%. As will be readily recognized, such a pressure-sensing device is particularly well-suited for use as a barometric pressure sensor or a suction-manifold pressure sensor. In addition, the device is not affected by reactive gas since its components for electrical pressure detection and amplification are all shielded from exterior atmospheric gas. The pressure sensitivity given above can be freely adjusted by varying the shape and size (including thickness) of the diaphragm and its mechanical properties such as Young's modulus and Poisson's ratio. For details of the adjusting procedure, reference may be made to on pages 103 and 104 of Reference 2.

The above-mentioned materials of the structural elements are given as mere examples. However, the materials for the cap 10, casing body 11, inlet pipe 12 and partition plate 18 may also be suitably selected from the group including common steels, brass, aluminum alloys and plastics. For the diaphragm 15, any of smooth-surfaced materials other than glass, including the metals, alloys and plastics listed above and also single crystals of silicon and saphire., may be used as well.

The elements 20 can not only be formed of Ni-Fe alloy material but also of any material selected from the group including Ni-Co alloys and multiple-element ferromagnetic alloys consisting mainly of Ni, Co and/or Fe by thin-film techniques typically including vapor deposition, sputtering or plating and etching. For the terminals 31, materials such as Al and Cu are satisfactorily usable.

As described above, all of the magnetoresistive elements of the present pressure-sensing device can be formed on the diaphragm at the same time by a use of thin-film techniques. The diaphragm need not necessarily be circular but may have any appropriate shape, as required. The present device, therefore, has the advantage that it can be manufactured with ease and at lower cost on a mass production basis by forming sets of MR elements and their terminals on a large sheet of diaphragm material and then cutting the sheets into chips of a predetermined shape and size. Another advantage of the present device is that it can be freely designed in different types ranging from a high sensitivity type for low pressure use to a low sensitivity one for high pressure use since the rate of resistance change of the MR elements can be adjusted by selection of the shape and mechanical properties of the diaphragm.

While the invention has been shown in connection with certain specific embodiments thereof, it will be apparent to those skilled in the art that it is not so limited but is susceptible of various changes and modifications without departing from the spirit and scope of the claimed invention.

What is claimed is:

1. A magnetoresistive pressure-sensing device for use in an automotive electronic engine control system comprising: a casing having an interior space divided into two chambers by a partition plate having a central aperture; a diaphragm held fixed over said aperture and on said partition plate; means for introducing into one of said chambers a fluid having a pressure which is to be measured; means for introducing a fluid under a reference pressure into the other of said chambers; said diaphragm being deflectible under the pressure differential of said fluids introduced into the two casing chambers; at least one magnetoresistive element mounted on said diaphragm for producing an electric resistance change depending on the deflection of said diaphragm; and a detector for detecting the variation in electric resistance of said magnetoresistive element responsive to said deflection.

2. A magnetoresistive pressure-sensing device as claimed in claim 1, in which said at least one magnetoresistive element is mounted on said diaphragm at the central or the peripheral region thereof.

3. A magnetoresistive pressure-sensing device as claimed in claim 1, which includes at least two magnetoresistive elements, one being formed of a material having a positive magnetoresistive constant and the other formed of a material having a negative magnetoresistive constant.

4. A magnetoresistive pressure-sensing device as claimed in claim 1, in which the reference pressure in said other chamber is a vacuum.

5. A magnetoresistive pressure-sensing device as claimed in claim 1, in which said other chamber in said casing is filled with inert gas.

6. A magnetoresistive pressure-sensing device as claimed in claim 1 in which said magnetoresistive element is in the shape of a bar.

7. A magnetoresistive device as claimed in claim 1 in which said magnetoresistive element is in a U-shape.

8. A magnetoresistive device as claimed in claim 1 in which said magnetoresistive element is a radial shape.

9. A magnetoresistive device as claimed in claim 1 in which said magnetoresistive element is a spiral shape.

10. A magnetoresistive device as claimed in claim 1 in which said magnetoresistive element is arcuate.

11. A pressure sensor comprising a pair of chambers separated by a deflectible diaphragm which is deformed responsive to the differential of pressures in said two chambers, a thin film magnetoresistive element formed on said diaphragm to produce a variation in an electrical current in said element responsive to said deflection of said diaphragm, electrical bridge means having said magnetoresistive element in at least one arm thereof whereby the balance of said bridge means varies as a function of the electrical current in said element, and difference amplifier means connected across said bridge to detect and signal the changes in the balance of said bridge.

12. The sensor of claim 11 wherein there are a plurality of said bridges, each with an individually associated difference amplifier means, and a common differential amplifier means connected to the outputs of said individually associated amplifier means.

13. The sensor of claim 11 wherein said chambers are separated by a partition having a circular aperture therein with a radius a, said diaphragm covering said aperture, said magnetoresistive element having a positive magnetorestriction constant and being mounted on said diaphragm within a radius approximately equal to $\frac{2}{3}a$.

14. The sensor of claim 11 wherein said chambers are separated by a partition having a circular aperture therein with a radius a, said diaphragm covering said aperture, said magnetoresistive element having a positive magnetorestriction constant and being mounted on said diaphragm within a radius approximately equal to $\frac{2}{3}a$, and a magnetoresistive element having a negative magnetorestriction constant and being mounted on said diaphragm in the area between the radius approximately equal to $\frac{2}{3}a$ and a radius equal to a.

15. The sensor of claim 11 wherein said chambers are separated by a partition having a circular aperture therein with a radius a, said diaphragm covering said aperture, and a magnetoresistive element having a negative magnetoresistive constant and being mounted on said diaphragm in the area between the radius approximately equal to $\frac{2}{3}a$ and a radius equal to a.

16. The sensor of claim 11 wherein said pair of chambers are formed in a casing of stainless steel having an outside diameter in the order of 30 mm, and the diaphragm is mounted over an aperture having a diameter approximately equal to 10 mm.

17. The sensor of claim 16 wherein said diaphragm is made of glass and has a thickness of about 0.5 mm and a diameter of about 20 mm.

* * * * *

UNITED STATES PATENT AND TRADEMARK OFFICE
CERTIFICATE OF CORRECTION

PATENT NO. : 4,217,783

DATED : August 19, 1980

INVENTOR(S) : Susumu Ito, Morimasa Nagao, Toshio Yamagata and Nobuyuki Hayama

It is certified that error appears in the above-identified patent and that said Letters Patent are hereby corrected as shown below:

On the title page, insert --[30] Foreign Application Priority Data

Feb. 23, 1978 [JA]  Japan...... 53-20456  --.

Col. 2, line 52, delete "to"

Col. 4, line 13, "therto" s/b  --thereto--

Col. 4, line 33, insert --σ-- after "stress"

Signed and Sealed this

Thirteenth Day of January 1981

[SEAL]

Attest:

SIDNEY A. DIAMOND

Attesting Officer

Commissioner of Patents and Trademarks